(12) United States Patent
LeBlanc et al.

(10) Patent No.: US 8,891,927 B2
(45) Date of Patent: Nov. 18, 2014

(54) FIBER DISTRIBUTION HUB WITH PASS-THROUGH INTERFACES

(75) Inventors: Thomas G. LeBlanc, Westminster, MA (US); James J. Solheid, Lakeville, MN (US); Douglas C. Ellens, Starbuck, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 717 days.

(21) Appl. No.: 13/102,463

(22) Filed: May 6, 2011

(65) Prior Publication Data

US 2011/0274403 A1 Nov. 10, 2011

Related U.S. Application Data

(60) Provisional application No. 61/332,576, filed on May 7, 2010.

(51) Int. Cl.
*G02B 6/00* (2006.01)
*G02B 6/44* (2006.01)

(52) U.S. Cl.
CPC ............ *G02B 6/4452* (2013.01); *G02B 6/4453* (2013.01)
USPC ....................................... 385/135

(58) Field of Classification Search
CPC combination set(s) only.
See application file for complete search history.

(56) References Cited

U.S. PATENT DOCUMENTS

| | | |
|---|---|---|
| 4,747,020 A | 5/1988 | Brickley et al. |
| 4,765,710 A | 8/1988 | Burmeister et al. |
| 4,792,203 A | 12/1988 | Nelson et al. |
| 4,995,688 A | 2/1991 | Anton et al. |
| 5,100,221 A | 3/1992 | Carney et al. |
| 5,129,030 A | 7/1992 | Petrunia |
| 5,179,618 A | 1/1993 | Anton |
| 5,274,731 A | 12/1993 | White |
| 5,289,558 A | 2/1994 | Teichler et al. |
| 5,363,465 A | 11/1994 | Korkowski et al. |
| 5,367,598 A | 11/1994 | Devenish, III et al. |
| RE34,955 E | 5/1995 | Anton et al. |
| 5,442,726 A | 8/1995 | Howard et al. |
| 5,448,015 A | 9/1995 | Jamet et al. |
| 5,497,444 A | 3/1996 | Wheeler |
| 5,511,144 A | 4/1996 | Hawkins et al. |
| 5,636,138 A | 6/1997 | Gilbert et al. |
| 5,708,751 A | 1/1998 | Mattei |
| 5,717,810 A | 2/1998 | Wheeler |
| 5,784,515 A | 7/1998 | Tamaru et al. |
| 5,823,646 A | 10/1998 | Arizpe et al. |

(Continued)

FOREIGN PATENT DOCUMENTS

JP 2000-231019 8/2000

OTHER PUBLICATIONS

International Search Report and Witten Opinion mailed Dec. 21, 2011.

*Primary Examiner* — Hemang Sanghavi
(74) *Attorney, Agent, or Firm* — Merchant & Gould P.C.

(57) ABSTRACT

A fiber distribution hub includes a chassis mounted to move relative to a cabinet. A termination field is mounted to the chassis. The chassis includes a first location at which a splitter region and a first pass-through region are positioned; and a second location at which a second pass-through region is positioned. The second location is spaced from the first location. Fibers input into adapters at the first pass-through region can be rerouted to act as splitter inputs at the splitter region.

20 Claims, 17 Drawing Sheets

(56) References Cited

U.S. PATENT DOCUMENTS

| | | |
|---|---|---|
| 5,945,633 A | 8/1999 | Ott et al. |
| 6,044,193 A | 3/2000 | Szentesi et al. |
| 6,061,492 A | 5/2000 | Strause et al. |
| 6,160,946 A | 12/2000 | Thompson et al. |
| 6,208,796 B1 | 3/2001 | Williams Vigliaturo |
| 6,236,795 B1 | 5/2001 | Rodgers |
| 6,256,443 B1 | 7/2001 | Uruno et al. |
| 6,278,829 B1 | 8/2001 | BuAbbud et al. |
| RE37,489 E | 1/2002 | Anton et al. |
| 6,356,697 B1 | 3/2002 | Braga et al. |
| 6,363,200 B1 | 3/2002 | Thompson et al. |
| 6,385,381 B1 | 5/2002 | Janus et al. |
| 6,424,781 B1 | 7/2002 | Puetz et al. |
| 6,434,313 B1 | 8/2002 | Clapp, Jr. et al. |
| 6,535,682 B1 | 3/2003 | Puetz et al. |
| 6,556,763 B1 | 4/2003 | Puetz et al. |
| 6,621,975 B2 | 9/2003 | Laporte et al. |
| 6,631,237 B2 | 10/2003 | Knudsen et al. |
| 6,661,961 B1 | 12/2003 | Allen et al. |
| 6,760,530 B1 | 7/2004 | Mandry |
| 6,760,531 B1 | 7/2004 | Solheid et al. |
| 6,778,752 B2 | 8/2004 | Laporte et al. |
| 6,788,786 B1 | 9/2004 | Kessler et al. |
| 6,792,190 B2 | 9/2004 | Xin et al. |
| 6,792,191 B1 | 9/2004 | Clapp, Jr. et al. |
| 6,845,207 B2 | 1/2005 | Schray |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,909,833 B2 | 6/2005 | Henschel et al. |
| 6,920,274 B2 | 7/2005 | Rapp et al. |
| 6,925,241 B2 | 8/2005 | Bohle et al. |
| 6,968,111 B2 | 11/2005 | Trebesch et al. |
| 6,980,725 B1 | 12/2005 | Swieconek |
| 6,983,095 B2 | 1/2006 | Reagan et al. |
| 7,086,539 B2 | 8/2006 | Knudsen et al. |
| 7,088,899 B2 | 8/2006 | Reagan et al. |
| 7,103,255 B2 | 9/2006 | Reagan et al. |
| 7,139,461 B2 | 11/2006 | Puetz et al. |
| 7,142,764 B2 | 11/2006 | Allen et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,200,317 B2 | 4/2007 | Reagan et al. |
| 7,218,827 B2 | 5/2007 | Vongseng et al. |
| 7,277,620 B2 | 10/2007 | Vongseng et al. |
| 7,333,707 B2 | 2/2008 | Puetz et al. |
| 7,369,741 B2 | 5/2008 | Reagan et al. |
| 7,406,242 B1 | 7/2008 | Braga |
| 7,407,330 B2 | 8/2008 | Smith et al. |
| 7,457,503 B2 | 11/2008 | Solheid et al. |
| 7,471,869 B2 * | 12/2008 | Reagan et al. ............... 385/139 |
| 7,623,749 B2 | 11/2009 | Reagan et al. |
| 7,646,958 B1 | 1/2010 | Reagan et al. |
| 7,720,343 B2 | 5/2010 | Barth et al. |
| 7,816,602 B2 | 10/2010 | Landry et al. |
| 8,121,458 B2 | 2/2012 | Barth et al. |
| 8,263,861 B2 | 9/2012 | Landry et al. |
| 8,569,618 B2 | 10/2013 | Landry et al. |
| 2002/0150372 A1 | 10/2002 | Schray |
| 2008/0031585 A1 | 2/2008 | Solheid et al. |
| 2008/0079341 A1 * | 4/2008 | Anderson et al. ............ 312/287 |
| 2008/0298762 A1 * | 12/2008 | Hawley et al. ............... 385/135 |
| 2009/0103879 A1 | 4/2009 | Tang et al. |
| 2010/0027952 A1 * | 2/2010 | Ruiz et al. .................... 385/135 |
| 2010/0129040 A1 * | 5/2010 | Zamzow et al. ............. 385/135 |

\* cited by examiner

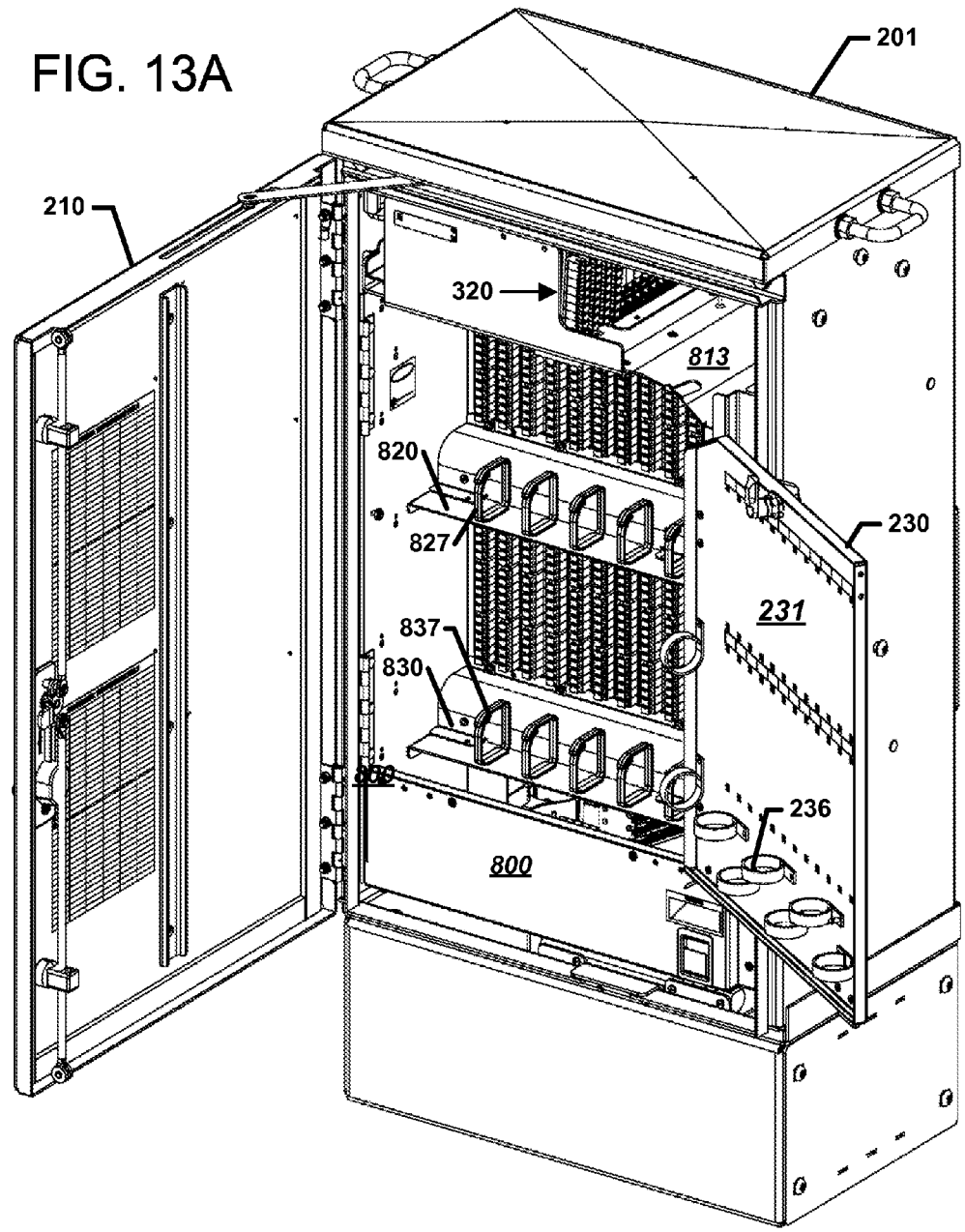

FIBER DISTRIBUTION HUB WITH PASS-THROUGH INTERFACES

CROSS-REFERENCE TO RELATED APPLICATION

The present application claims the benefit of U.S. Provisional Patent Application Ser. No. 61/332,576, filed May 7, 2010.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 having one or more optical splitters (e.g., 1-to-8 splitters, 1-to-16 splitters, or 1-to-32 splitters) that generate a number of individual fibers that may lead to the premises of an end user 105. The various lines of the network 100 can be aerial or housed within underground conduits.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often connected to drop terminals 104 that include connector interfaces for facilitating coupling of the fibers of the branch cables to a plurality of different subscriber locations 105.

Splitters used in an FDH 103 can accept a feeder cable F1 having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 103 as required.

SUMMARY

Certain aspects of the disclosure relate to fiber distribution hubs.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIGS. 13A AND 13B are front views of the hub of FIG. 9 in which the door is open, the frame is open, and the chassis is closed in accordance with the principles of the present disclosure;

DETAILED DESCRIPTION

Figure 1:
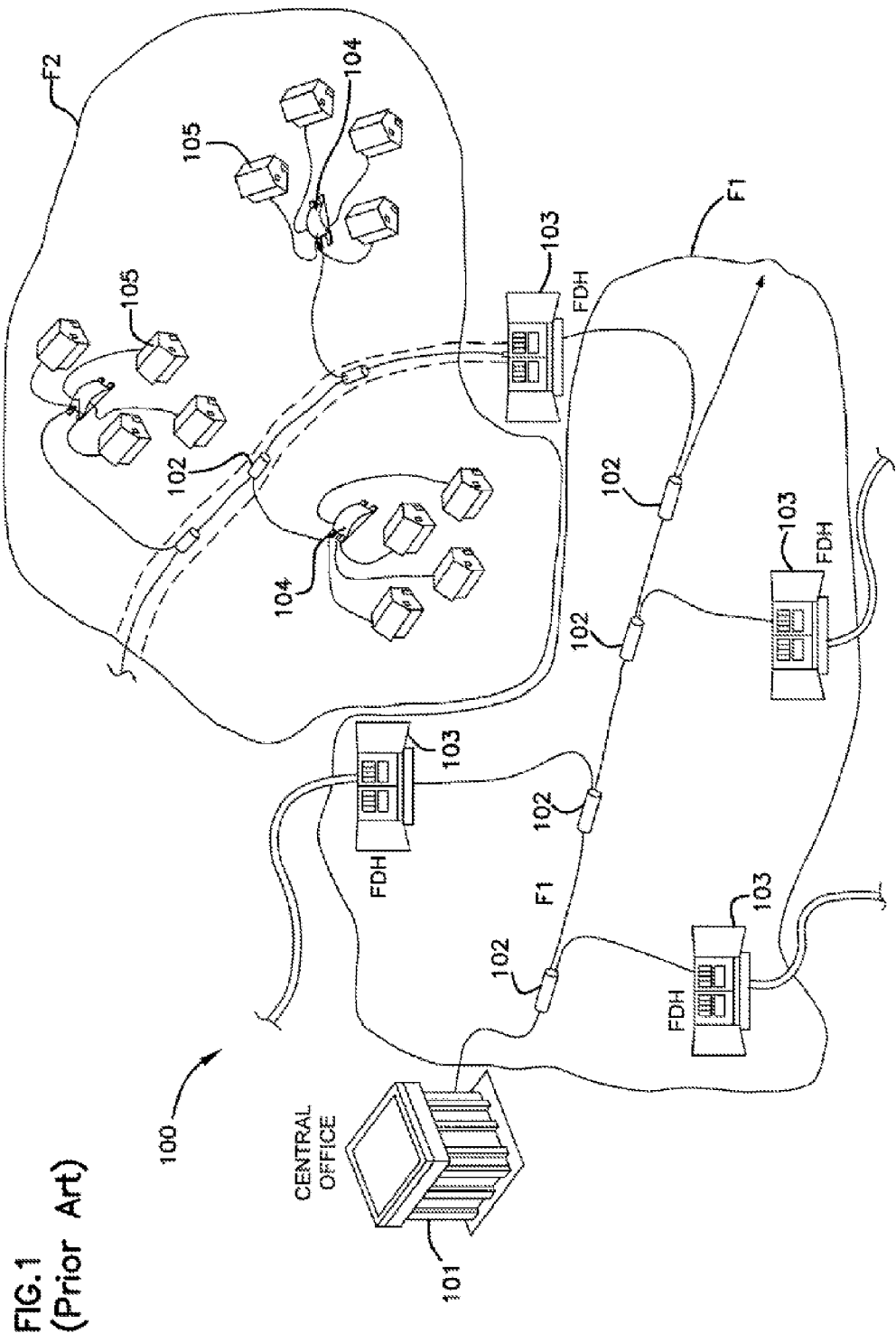
FIG. 1 shows a passive fiber optic network.
Figure 2:
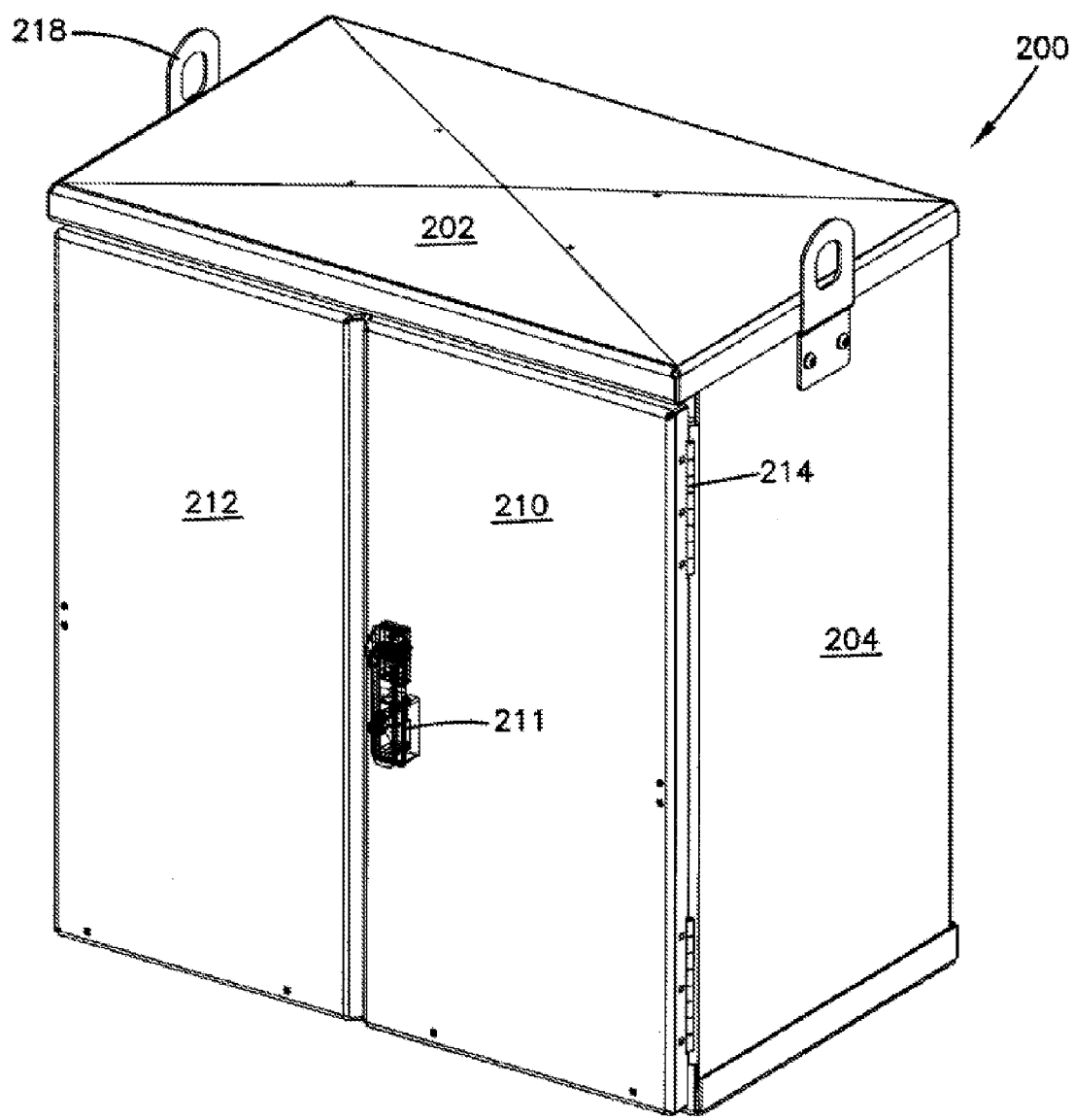
FIG. 2 is a front perspective view of an example fiber distribution hub having a cabinet with front doors shown in a closed position in accordance with the principles of the present disclosure.

Referring now to FIG. 2, an example fiber distribution hub (FDH) 200 in accordance with the principles of the present disclosure is shown. The FDH 200 provides an interconnect interface for optical transmission signals at a location in the network where operational access and reconfiguration are desired. For example, in accordance with some aspects, the FDH 200 can be used to split the feeder cables 710 and terminate the split feeder cables 700 to subscriber distribution cables 710 routed to subscriber locations. In accordance with other aspects, the FDH 200 also can provide signals directly from the feeder cables 700 to the subscriber cables 710 without splitting the signals.

The FDH 200 includes a cabinet 201 that houses internal components. The cabinet 201 is designed to accommodate a range of alternative sizes and fiber counts and support factory installation of pigtails, fanouts and splitters. In general, the cabinet 201 of the FDH 200 is configured to protect the internal components against rain, wind, dust, rodents and other contaminants. However, the cabinet 201 remains relatively lightweight for easy installation, and breathable to prevent accumulation of moisture in the unit. In some embodiments, an aluminum construction with a heavy powder coat finish also provides for corrosion resistance. In one example embodiment, the cabinet 201 is manufactured from heavy gauge aluminum and is NEMA-4X rated. In other embodiments, however, other materials can also be used.

In accordance with some aspects, the cabinet 201 includes a top panel 202, a bottom panel 203, a right side panel 204, a left side panel 206, a back panel 205, and at least one front door. The at least one front door is pivotally mounted to the cabinet 201 using hinges 214, 216 to facilitate access to the components mounted within the cabinet 201. In certain implementations, the cabinet 201 includes a right door 210 and a left door 212. In one implementation, the front doors 210, 212 include a lock 211.

In accordance with example embodiments, the FDH 200 is provided in pole mount or pedestal mount configurations. For example, as shown in FIG. 2, loops 218 can be provided on the cabinet 201 for facilitating deployment of the cabinet 201 at a desired location. The loops 218 can be used to position the cabinet using a crane. In particular, the crane can lower the cabinet 201 into an underground region. In some embodiments, the loops 218 are removable or can be adjusted to not protrude from the top cabinet panel 202.

The cabinet 201 includes a cable port 215 through which a feeder cable (e.g., or F1 cable) 700 and a subscriber cable (e.g., or F2 cable) 710 enter and exit the cabinet 201. Fibers of the feeder cable 700 are optically coupled to fibers of the subscriber cable 710 at a termination area 340 (see FIG. 3). Optionally, the cabinet 201 also can house a splitter area 310 at which signals carried on the feeder fibers can be split onto splitter pigtail fibers, one or more pass-through areas at which signals carried on the feeder fibers can be passed to the pass-through patch cords without being split, and a storage area 350 for temporarily storing connectorized ends of the splitter pigtails and pass-through pigtails.

Figure 3:
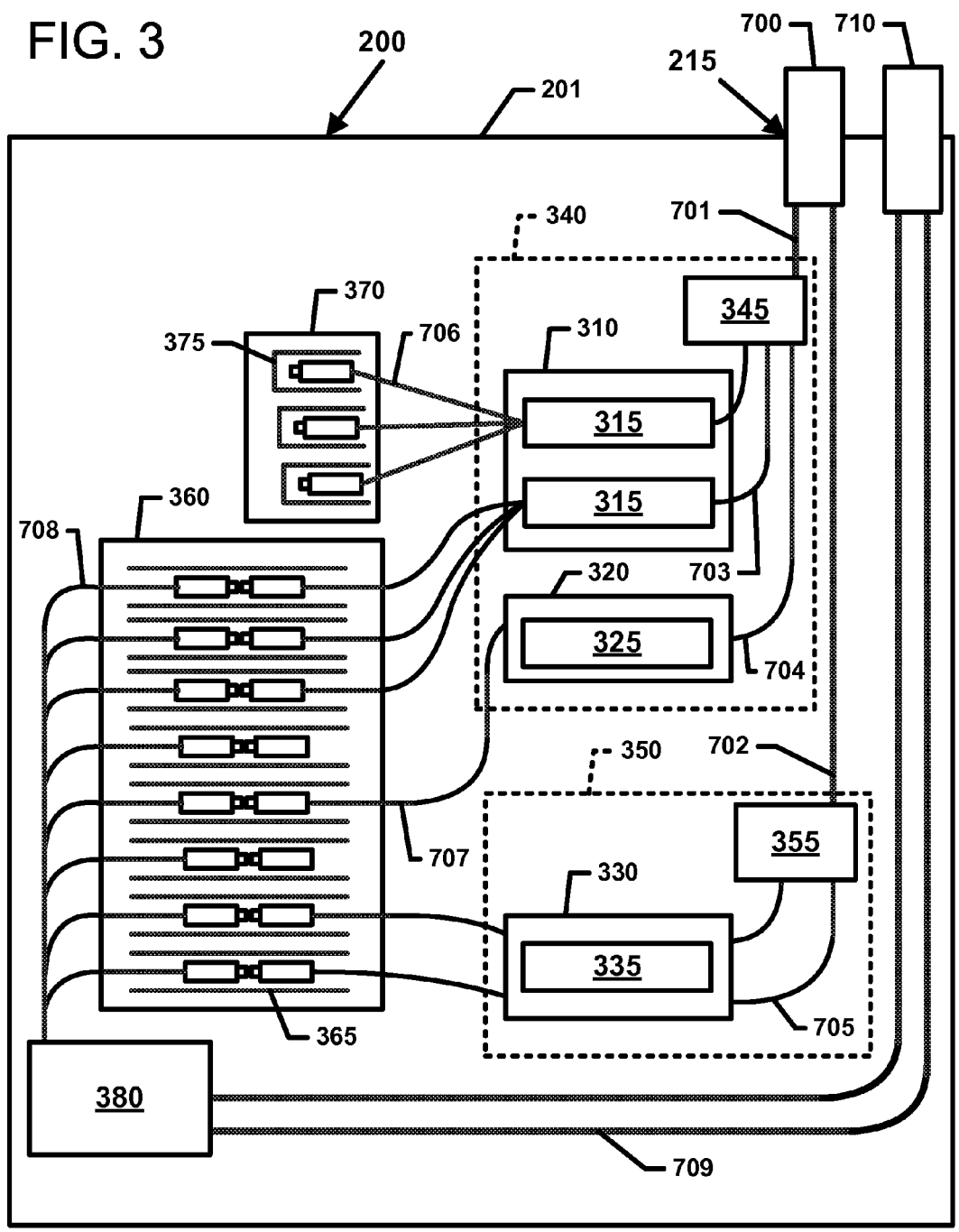
FIG. 3 is a schematic diagram showing an example cable routing scheme for a fiber distribution hub in accordance with the principles of the present disclosure.

FIG. 3 is a schematic diagram showing an example cable routing scheme 300 for the FDH 200. The FDH 200 generally administers connections at the termination area 340 between incoming fiber and outgoing fiber in an Outside Plant (OSP) environment. As the term is used herein, "a connection" between fibers includes both direct and indirect connections. Examples of incoming fibers include the feeder cable fibers 700 that enter the cabinet 201 and intermediate fibers (e.g., connectorized splitter pigtails and patching fibers/jumpers) that connect the feeder cable fiber to the termination panel. Examples of outgoing fibers include the subscriber cable fibers 710 that exit the cabinet 201 and any intermediate fibers that connect the subscriber cable fibers 710 to the termination area 340.

As shown at FIG. 3, at least one feeder cable 700 and at least one subscriber cable 710 are initially routed into the FDH 200 through a cable port 215 defined in the cabinet 201 (e.g., typically through the back or bottom of the cabinet 201). In accordance with certain aspects, the fibers of the feeder cables 700 and/or subscriber cables 710 can include ribbon fibers. Some example feeder cables 700 may include twelve to forty-eight individual fibers. Some example subscriber cables 710 may include 144, 216 or 432 individual fibers.

The cabinet 201 includes a termination region 360 that is the dividing line between the incoming fibers and the outgoing fibers. The fibers of the feeder cable 700 and subscriber cable 710 are routed to opposite sides of the termination region 360 to optically couple together, e.g., at fiber optic adapters 365. For example, the fibers of the feeder cable 700 (or intermediate fibers connected thereto) can be plugged into first ports of the adapters 365 and fibers of the subscriber cable 710 (or intermediate fibers connected thereto) can be plugged into second, corresponding ports of the adapters 365.

In accordance with aspects of the disclosure, one or more fibers of the subscriber cable 710 are routed through the cabinet 201 to the second side of the termination region 360. In certain implementations, each subscriber cable fiber 708 is terminated with a fiber optic connector that is plugged into the second port of a fiber optic adapter 365 mounted at the termination region 360. For example, in some implementations, one or more buffered groups 709 of subscriber cable fibers 708 can be routed to a set of one or more fanouts 380 at which the subscriber cable fibers 708 are separated into the individual fibers 708. In one implementation, the subscriber cable fibers 708 are upjacketed at the fanouts 380.

In accordance with aspects of the disclosure, the fibers of the feeder cable 700 can follow one of at least three different paths to the first side of the termination region 360. In accordance with some aspects, one or more fibers of the feeder cable 700 are routed a splitter region 310 of the cabinet 201. In accordance with other aspects, one or more fibers of the feeder cable 700 are routed to a first pass-through region 320 of the cabinet 201. In accordance with other aspects, one or more fibers of the feeder cable 700 are routed to a second pass-through region 330 of the cabinet 201. By refraining from splitting a feeder cable fiber (i.e., by routing the fiber to one of the pass-through areas 340, 350), a stronger signal can be sent to one of the subscribers.

In accordance with some implementations, the splitter region 310 and the first pass-through area 320 can be positioned at a first location 340 within the cabinet 201 and the second pass-through area 330 can be positioned at a second location 350 within the cabinet 201 spaced from the first location 340. For example, the first location 340 can be at a top of the cabinet 201 or frame mounted therein and the second location 350 can be at a bottom of the cabinet 201 of frame mounted therein.

In certain implementations, the feeder cable fibers are grouped in buffer tubes that are routed to one of the locations 340, 350. One or more fanouts, which separate out the buffered fibers, can be positioned at each location. For example, a first set of one or more fanouts 345 can be positioned at the first location 340 to separate out feeder cable fibers from first buffered groups 701 that are routed to the first location 340. A second set of one or more fanouts 355 can be positioned at the second location 350 to separate out feeder cable fibers from second buffered groups 702 that are routed to the second location 340. In certain implementations, the fibers are upjacketed at the fanouts 310.

In accordance with some aspects, a first set of one or more fibers 703 separated at the first set of fanouts 345 are routed to the splitter area 310. Each of these splitter input fibers 703 is optically connected to a splitter module 315 positioned at the splitter area 310. For example, each splitter input fiber 703 can be plugged into a fiber optic adapter of the splitter module 315. At each splitter module 315, signals carried by the splitter input fiber 703 are split onto multiple splitter pigtails 706, each having a connectorized end (e.g., an end terminated at a fiber optic connector).

When service is desired, the splitter pigtails 706 can be routed to the first side of a termination region 360. For example, the connectorized end of each splitter pigtail 706 can be plugged into the first port of a corresponding fiber optic adapter 365 positioned at the termination region 360. Plugging the connectorized end of the splitter pigtail 706 into the adapter port creates an optical path between the splitter pigtail 706 and the subscriber fiber 708 plugged into the corresponding port.

In accordance with other aspects, a second set of one or more fibers 704 separated at the first set of fanouts 345 are routed to the first pass-through area 320. Each of these pass-through fibers 704 is positioned at a pass-through interface device 325 located at the first pass-through area 320. Non-limiting examples of pass-through interface devices 325 include fiber optic adapters (e.g., fixed or sliding), splice trays, or other devices configured to create an optical path between optical fibers.

When service is desired, one or more pass-through patch cords 707 can be routed between the first side of the termination field 360 and the first pass-through region 320. One example patch cord 707 includes two connectorized ends. For example, a first connectorized end of each pass-through patch cord 707 can be connected to one of the interface devices 325 (e.g., plugged into an adapter port) and a second connectorized end of each patch cord 707 can be plugged into the first port of an adapter 365 at the termination region 360.

In accordance with some aspects, because the splitter region 310 and the first pass-through region 320 are positioned in the same location, one or more of the second set of fibers 704 can be rerouted to the splitter region 310 as splitter input fibers 703 if additional splitter input is required. In accordance with other aspects, one or more of the first set of fibers 703 can be rerouted to the first pass-through region 320 as pass-through input fibers 704 if additional pass-through input is required.

In accordance with other aspects, a third set of one or more fibers 705 separated at the second set of fanouts 355 are routed to the second pass-through area 330. For example, the second pass-through fibers 705 can be separated out from one or more buffered groups 702 of feeder cable fibers at the second location 350. Each of the second pass-through fibers 705 is positioned at a pass-through interface device 335 located at the second pass-through area 330.

When service is desired, one or more pass-through patch cords 707 can be routed between the first side of the termination field 360 and the interface devices 335 at the second pass-through region 320, e.g., as discussed above with respect to the first pass-through region 320.

In some implementations, one or more of the splitter pigtails 706 can be routed to a storage region 370 for temporary storage when service is not required. In certain implementations, the connectorized end of each splitter pigtail 706 routed to the storage region 370 are held at the storage region 370. For example, in some implementations, at least a portion of the fiber optic connector terminating each splitter pigtail 706 can be retained by a connector holder 375 mounted at the storage region 370. In certain implementations, connectorized ends of one or more patch cords 707 also can be routed to the storage region 370.

Figure 4:
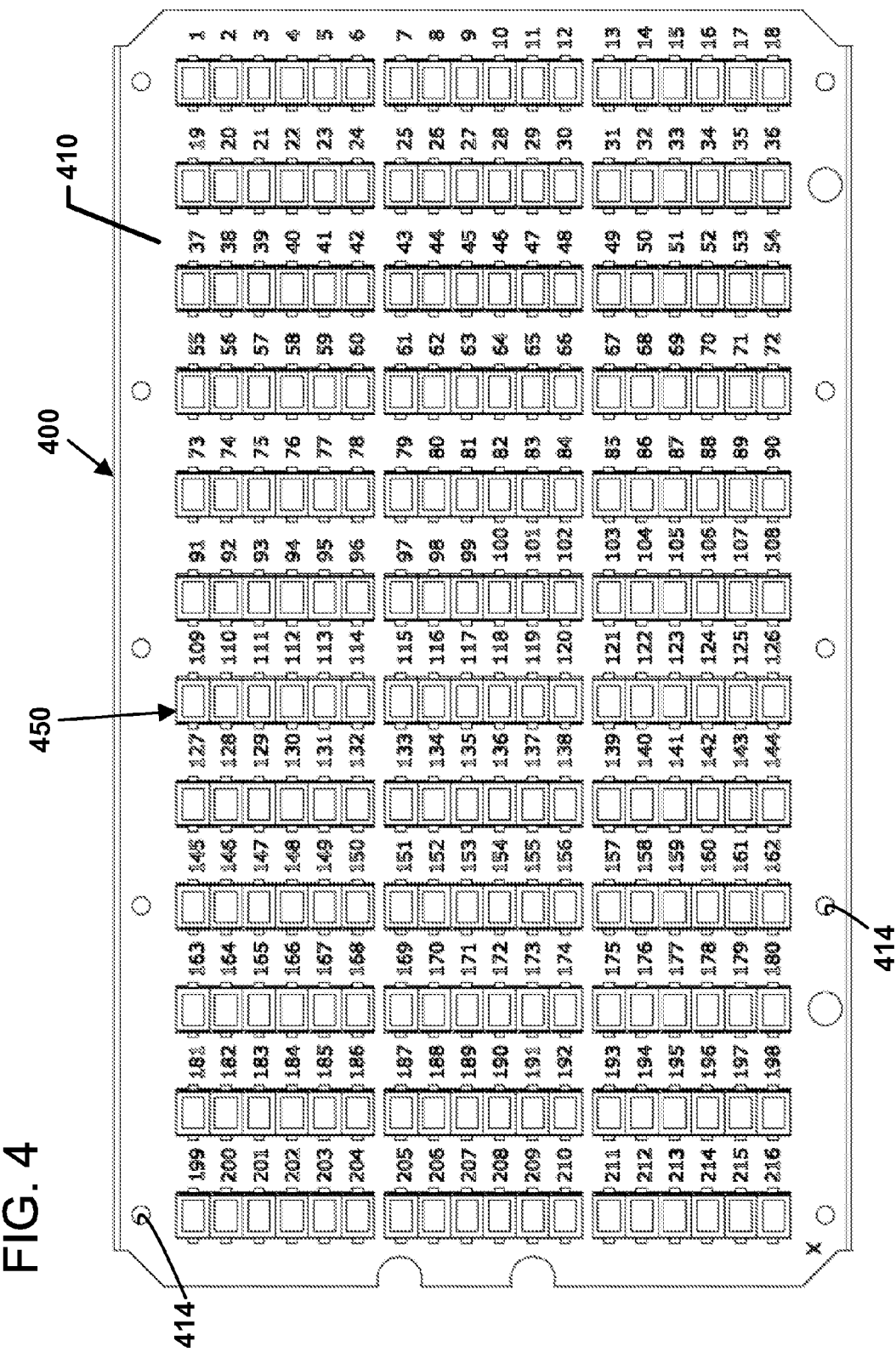
FIG. 4 is a front view of an example termination panel suitable for use at a termination region in accordance with the principles of the present disclosure.
Figure 5:
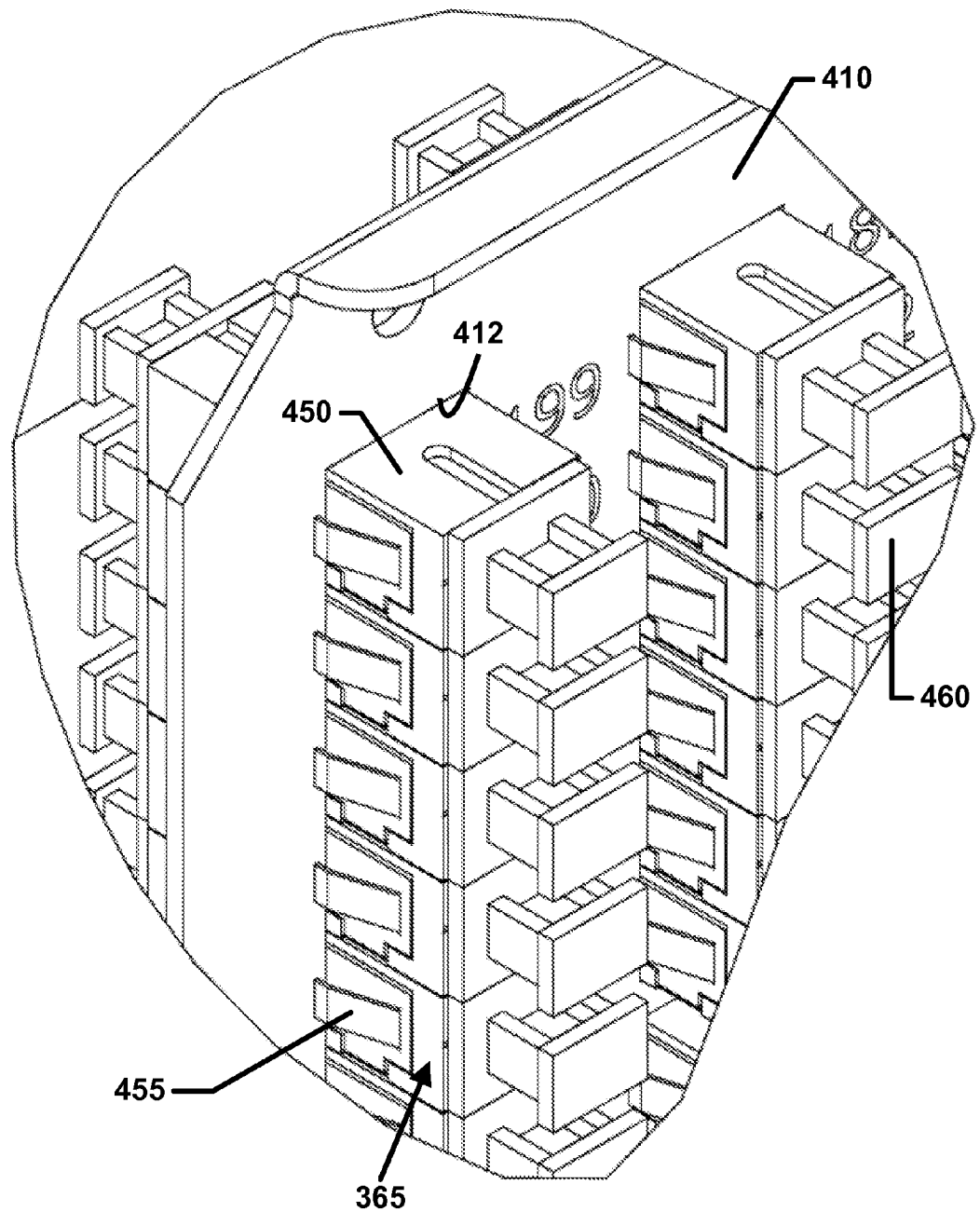
FIG. 5 is a detailed view of a portion of the termination panel shown in FIG. 4 in accordance with the principles of the present disclosure.

FIGS. 4 and 5 show one example implementation 400 of a termination field 360 including example implementations 450 of fiber optic adapters 365. The example termination field 400 includes a panel 410 defining openings 412 within which one or more adapters 450 can mount. In certain implementations, the termination field 400 can include multiple panels 410. Labeling or other indicia can be provided on the panel 410 adjacent the openings. The panel 410 defines openings 414 through which fasteners can extend to secure the panel 410 within the cabinet 201.

Each adapter 450 extends through one of the openings 412 between first and second sides of the panel. Each adapter 450 defines first and second ports at which fiber optic connectors can be received. Each adapter 450 also includes a sleeve or other structure for aligning ferrules of the fiber optic connectors to create an optical path. Adapter dust caps 460 (FIG. 5) can be mounted within the ports that are not in use.

In some implementations, the fiber optic adapters 450 are individually mounted to a panel or bulkhead. For example, each adapter 450 can include spring-biased latching tabs 455 (FIG. 5) to facilitate mounting the adapter 450 to the panel 410. In other implementations, one or more groups of the fiber optic adapters 450 are fixedly arranged in respective housings to form adapter modules mounted to the termination panel 410. In one implementation, the fiber optic adapter modules include sliding adapter packs, as disclosed in U.S. Pat. Nos. 7,194,181; 5,497,444; 5,717,810; 5,758,003; and 6,591,051, the disclosures of which are hereby incorporated by reference herein.

Figure 6:
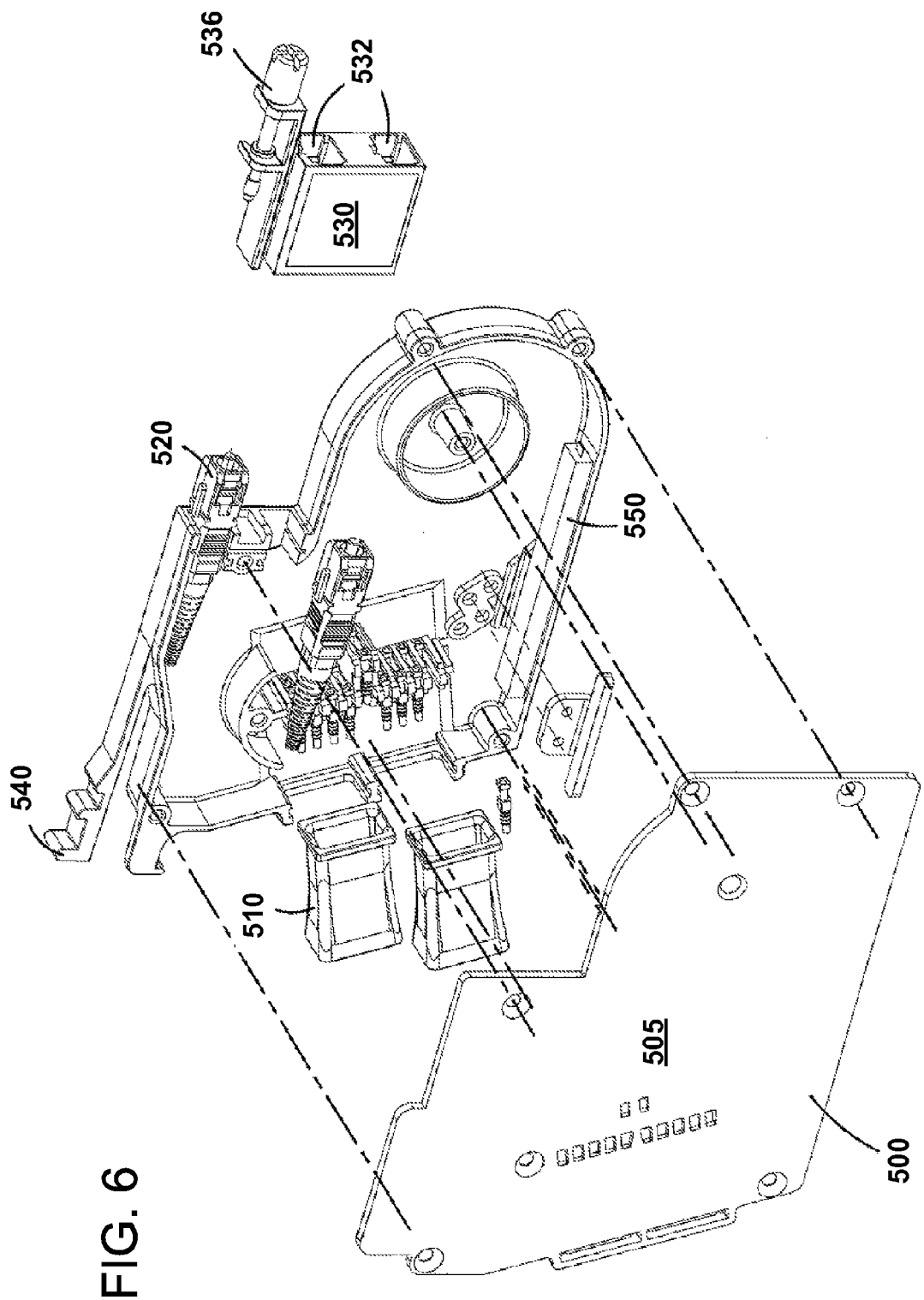
FIG. 6 shows one example of an example splitter module in accordance with the principles of the present disclosure.

FIG. 6 shows one example implementation 500 of a splitter module 315 suitable for mounting at the splitter region 310 of the cabinet 201. The example splitter module 500 includes a housing 505 enclosing at least a first splitter 550. Each splitter 550 is configured to split optical signals carried by an input fiber 703 onto a plurality of output fibers 706. In some implementations, the output fibers 706 exit the splitter module housing 505 through one or more exit members or boots 510. In the example shown, the splitter module 500 includes two boots 510.

In some implementations, each splitter 500 splits optical signals carried by one to four input fibers 703. In other implementations, the splitter 550 can receive greater or fewer input fibers 703. In some implementations, each splitter 500 outputs the split signals onto between two and sixteen output fibers 706 for every input fiber 703. In other implementations, the splitter 550 can output the split signals onto greater or fewer output fibers 706. In one example implementation, one input fiber 703 enters a splitter module 500 and sixty-four pigtail fibers 706 exit the splitter module 500.

In some implementations, the splitter module 500 includes at least one integral connector 520 at which incoming signals can be received (e.g., from another fiber optic connector via an adapter). In the example shown, the splitter module 500 includes two integral connectors 520 protruding from the rear of the splitter housing 505. In another example implementation, each splitter has four integral connectors 520. In some implementations, a handle 540 also protrudes from the front end of the splitter housing 505.

An adapter assembly 530 is positioned at the splitter region 310 (e.g., as will be discussed in more detail herein). In one implementation, the adapter assembly 530 is secured using a fastener 536. The adapter assembly 530 is configured to receive the connectors 520 of the splitter module 500 when the splitter module 500 is mounted at the splitter region 310. As shown, the adapter assembly 530 is further configured to receive an opposing connector terminating one of the splitter input fibers 703. In this way, the splitter input fibers 703 can be readily coupled to the splitter modules 500.

Other implementations of splitter modules 500 do not include integral connectors 520. In such implementations, first ends of the splitter inputs 703 pass through the splitter housing 505 and enter the splitter module 500. The opposing ends of the input fibers 703 can be connectorized or unconnectorized. If these opposing ends terminate in connectors, then the input fibers 703 can be interfaced with fibers of the feeder cable 700 using one or more fiber optic adapters. If the ends are unconnectorized, however, then the input fibers 703 can be spliced with the feeder cable fibers (e.g., using a splice tray).

Further information regarding example splitter modules 500 can be found in the U.S. Pat. No. 7,418,181; U.S. Pat. No. 7,376,322; U.S. Pat. No. 7,400,813; U.S. Pat. No. 7,346,254; and U.S. Pat. No. 7,245,809, the disclosures of which are hereby incorporated herein by reference.

Figure 7:
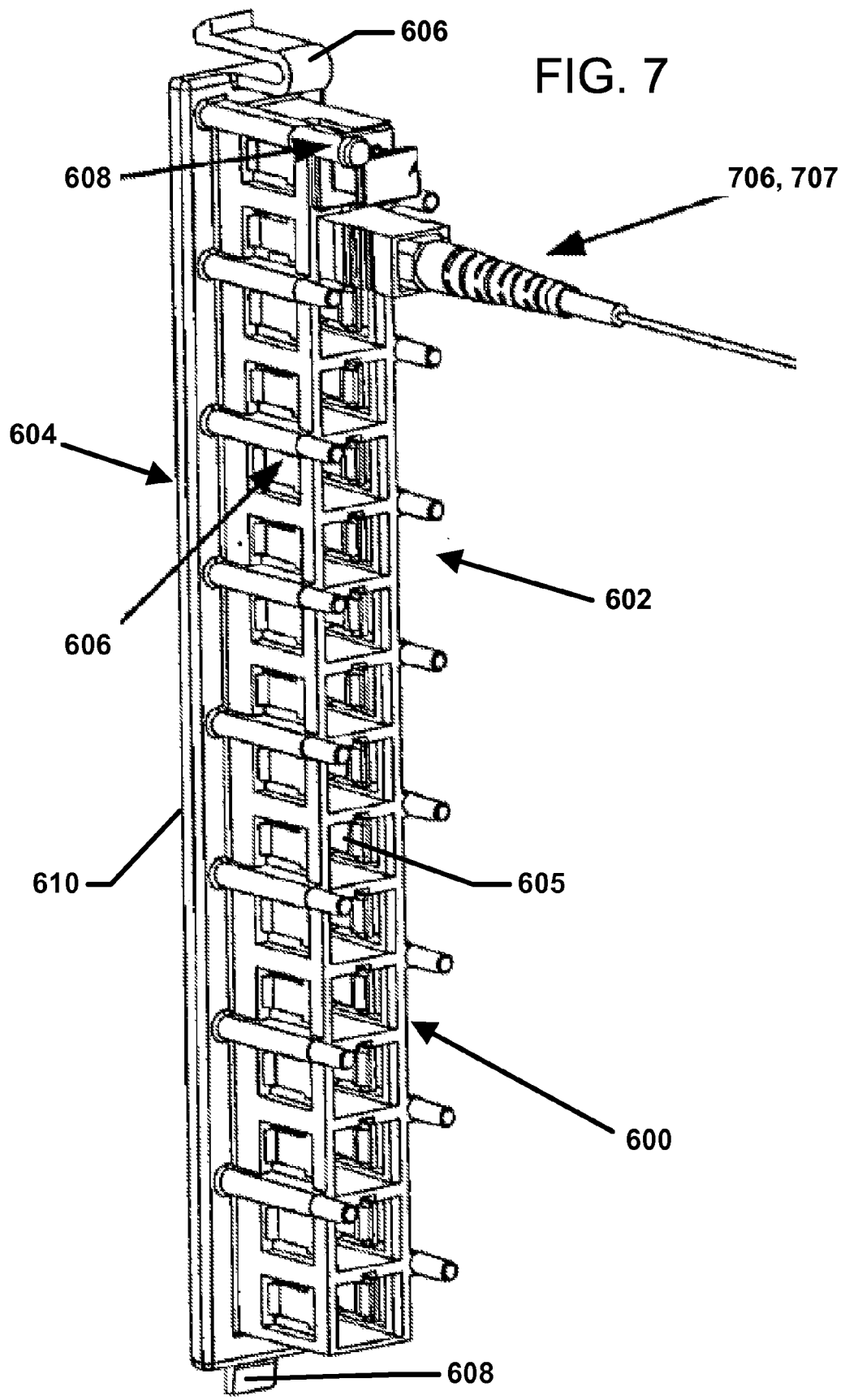
FIG. 7 shows a perspective view of an example storage module in accordance with the principles of the present disclosure.

FIG. 7 shows one example implementation 600 of a storage module 375 suitable for mounting at the storage region 370 of the cabinet 201. The storage module 600 includes a body 610 having a front side 602 and a rear side 604. The body 610 is configured to hold at least one fiber connector (e.g., terminating a splitter pigtail 706). In one implementation, the body 610 is configured to hold about eight connectors. In one implementation, the body 610 is configured to hold about twelve connectors. In some embodiments, the body 610 is arranged to retain the fiber connectors 706 in a single row configuration. In other embodiments, the body 610 can be arranged to hold the connectors 706 in a square pattern or in any other desired configuration.

In some implementations, the fiber optic connectors terminating the splitter pigtails 706 and/or patch cords 707 are held within one or more cavities 605 defined in one or more connector holders. In one implementation, the connectorized ends can be held within a closed cavity defined in a connector holder 600. In one implementation, the connectorized ends can be held within a through-cavity (i.e., two-ended cavity) defined in a connector holder 600. For example, each connectorized end can be stored with a dust cap mounted over a ferrule thereof.

In some implementations, the connector holder body 610 includes one or more dust cap posts 606 at which connector dust caps 608 may be stored when connectors are removed from the connector holder 600 to be put into active service. Further information regarding the example storage modules 600 can be found in U.S. Pat. No. 7,369,741 B2, U.S. Pat. No. 7,218,827, U.S. Pat. No. 7,233,731, and U.S. Pat. No. 7,198,409, the disclosures of which are hereby incorporated herein by reference.

Figure 8:
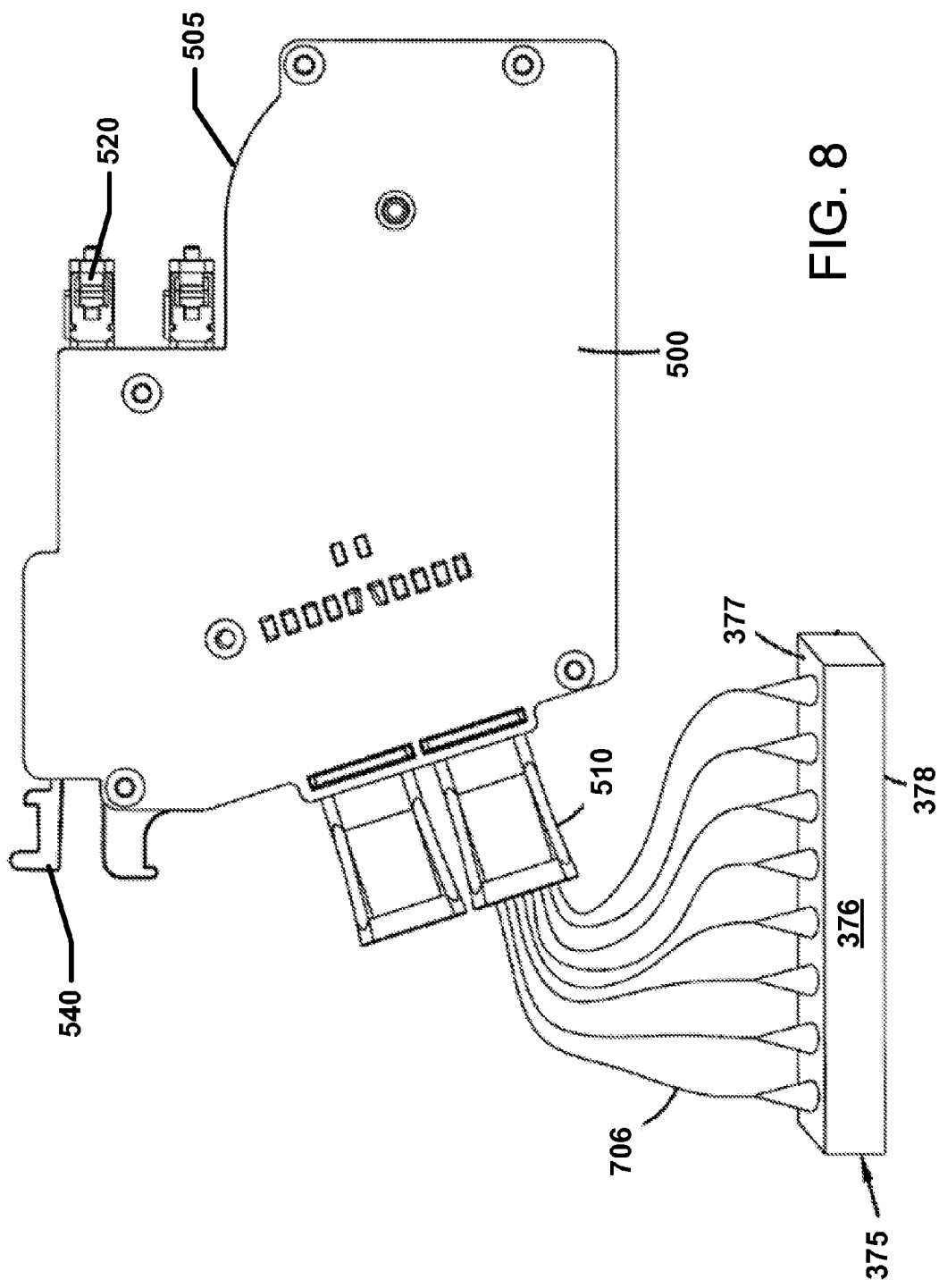
FIG. 8 shows an example splitter module having eight output fibers including connectorized ends secured to a storage module in accordance with the principles of the present disclosure.

Referring now to FIG. 8, the splitter modules 500 and storage modules 600 can be incrementally added to the cabinet 201. FIG. 8 illustrates a splitter module 500 having multiple connectorized pigtails 706 exiting from a protective boot 510. The connectorized pigtails 706 are typically stored in one or more storage modules 600 prior to installation within the cabinet 201. In some embodiments, the connector terminating each pigtail 706 is secured in a storage module 600 before the splitter module 500 leaves the factory. Typically, the connectorized pigtails 706 of each splitter module 500 are routed to four storage modules 600 each holding twelve connectors.

Referring to FIGS. 9-12, one example implementation of a fiber distribution hub 200 is shown. The example hub cabinet 201 shown has a single door 210 that covers an access opening leading to an interior of the cabinet 201. The door 210 is configured to pivot about hinges 213. A chassis 800 (see FIG. 10), which will be described in more detail herein, also is positioned within the cabinet 201. A frame 230 also can be mounted within the cabinet 230 as discussed in more detail below. The chassis 800 and the frame 230 are each configured to move relative to the cabinet 201.

Figure 10:
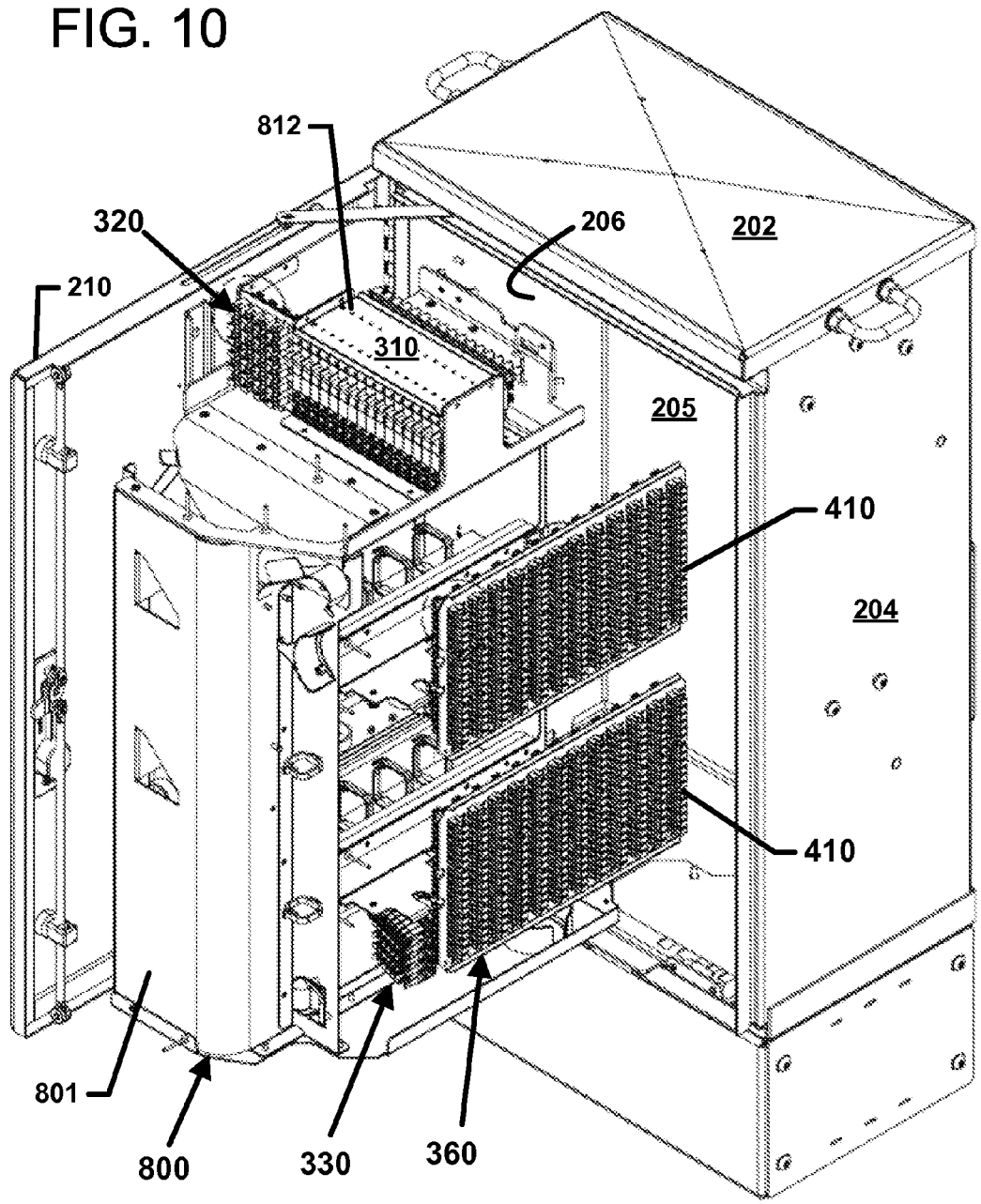
FIG. 10 is a front, perspective view of the fiber distribution hub of FIG. 9 with the frame and a chassis arranged in an open position in accordance with the principles of the present disclosure, and with termination panels exploded out from the chassis for ease in viewing.

The chassis 800 includes a body 801 that includes one or more horizontal platforms or trays (see FIG. 10). For example, the chassis 800 shown includes a top platform 810, a lower platform 840, and two intermediate platforms 820, 830 (see FIG. 14). In other implementations, however, the chassis 800 can include greater or fewer platforms. One or more panels extend between the platforms. In certain implementations, the chassis 800 includes at least one routing structure 850 (FIG. 14) on one side of the chassis 800 that will be described in more detail herein.

In one implementation, the chassis 800 is configured to pivot about a hinge axis. For example, the chassis 800 can pivot between a closed position (see FIG. 9) and an open position (see FIG. 10) about hinges 805. In the example shown, the hinges 805 are located on an opposite side of the chassis 800 from the cable routing structure 850. When the chassis 800 is in the closed position, only one side (e.g., the front) of the chassis 800 is accessible from the access opening of the cabinet 201. When the chassis 800 is in the open position, the other side (e.g., the rear) of the chassis 800 is accessible from the access opening of the cabinet 201. In example embodiments, the chassis 800 includes a release latch that locks the chassis 800 in a closed position within the cabinet 201 until the latch is actuated. Once the latch is actuated, the chassis 800 can be pivoted out of the cabinet 201. In addition, a pivoting locking member can be mounted to rear side of the chassis 800 to hold the chassis 800 in the open position.

In some implementations, the hinges 805 (FIG. 9) of the chassis 800 are positioned to provide a single point of flex for the fiber cables routed to the chassis 800. This hinge point is constructed to control the fiber bend. In particular, the hinges and cable management devices are designed to ensure that manufacture recommended bend radii are maintained when the chassis 800 is opened or closed. In one embodiment, the cabinet 201 can be configured at a factory, or plant, so as to have cable bundles dressed around the chassis hinges. Pre-configuring the cabinet 201 reduces the chance that cabling will be done incorrectly.

In accordance with some aspects, at least one of the internal components of the cabinet 201 is mounted on the chassis 800. For example, in some implementations, the termination field 360 can be mounted to the moveable chassis 800 (see FIG. 10). Only the front side of the termination field 360 is accessible when the chassis 800 is in the closed position and the rear side of the termination field 360 is accessible when the chassis 800 is in the open position. In the example shown, the termination field 360 includes two vertically extending termination panels 410 that are each mounted to the chassis 800. Each panel 410 holds twelve columns of eighteen adapters 450. In other implementations, each panel 410 can hold greater or fewer columns of greater or fewer adapters 450.

In certain implementations, the first location 340 (i.e., the location of the splitter region 310 and first pass-through region 320) is on the chassis 800. For example, the splitter region 310 and the first pass-through region 320 can be located at a top of the chassis 800 (see FIG. 10). In one implementation, the splitter region 310 and first pass-through region 320 are located above the termination field 360. In the example shown, the splitter region 310 and the first pass-through region 320 are located side-by-side. In other implementations, however, the splitter region 310 and first pass-through region 320 can be vertically spaced from each other. In still other implementations, however, one or more of these regions 310, 320 can be located elsewhere within the cabinet 201.

Figure 11:
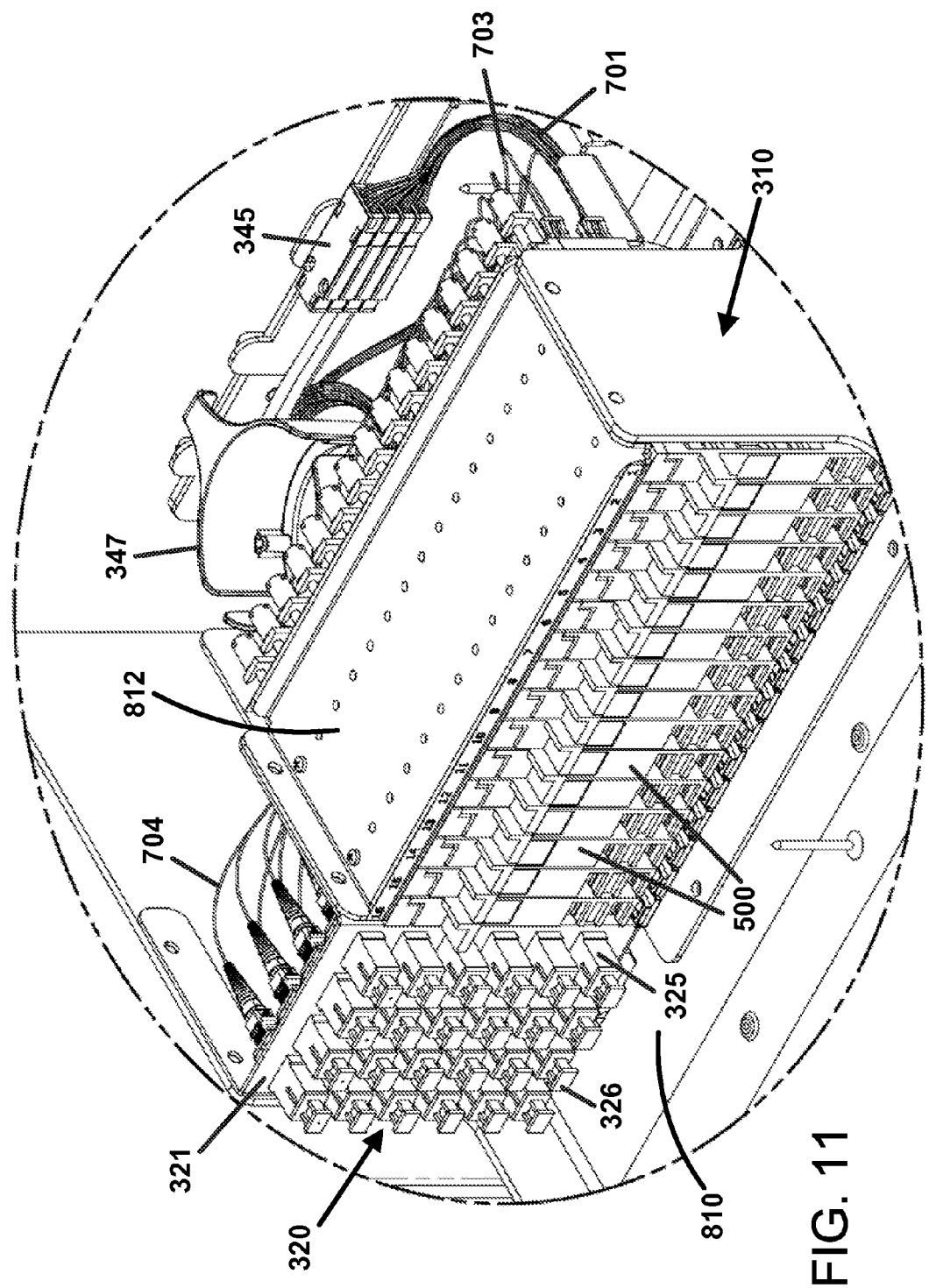
FIG. 11 is an enlarged view of a portion of FIG. 14, demarcated by the line 11 in FIG. 14, showing the first location within the hub of FIG. 9 at which a first pass-through device is positioned in accordance with the principles of the present disclosure.

FIG. 11 shows one example implementation of the splitter region 310 and the first pass-through region 320. The splitter region 310 includes a splitter module housing 812 positioned on the top platform 810 of the chassis 800. The splitter module housing 812 defines a cavity within which one or more splitter modules 500 can be mounted. In the example shown, sixteen splitter modules 500 are mounted within the splitter module housing 812. Labeling or other indicia can be provided on the splitter module housing 812.

Figure 13B:
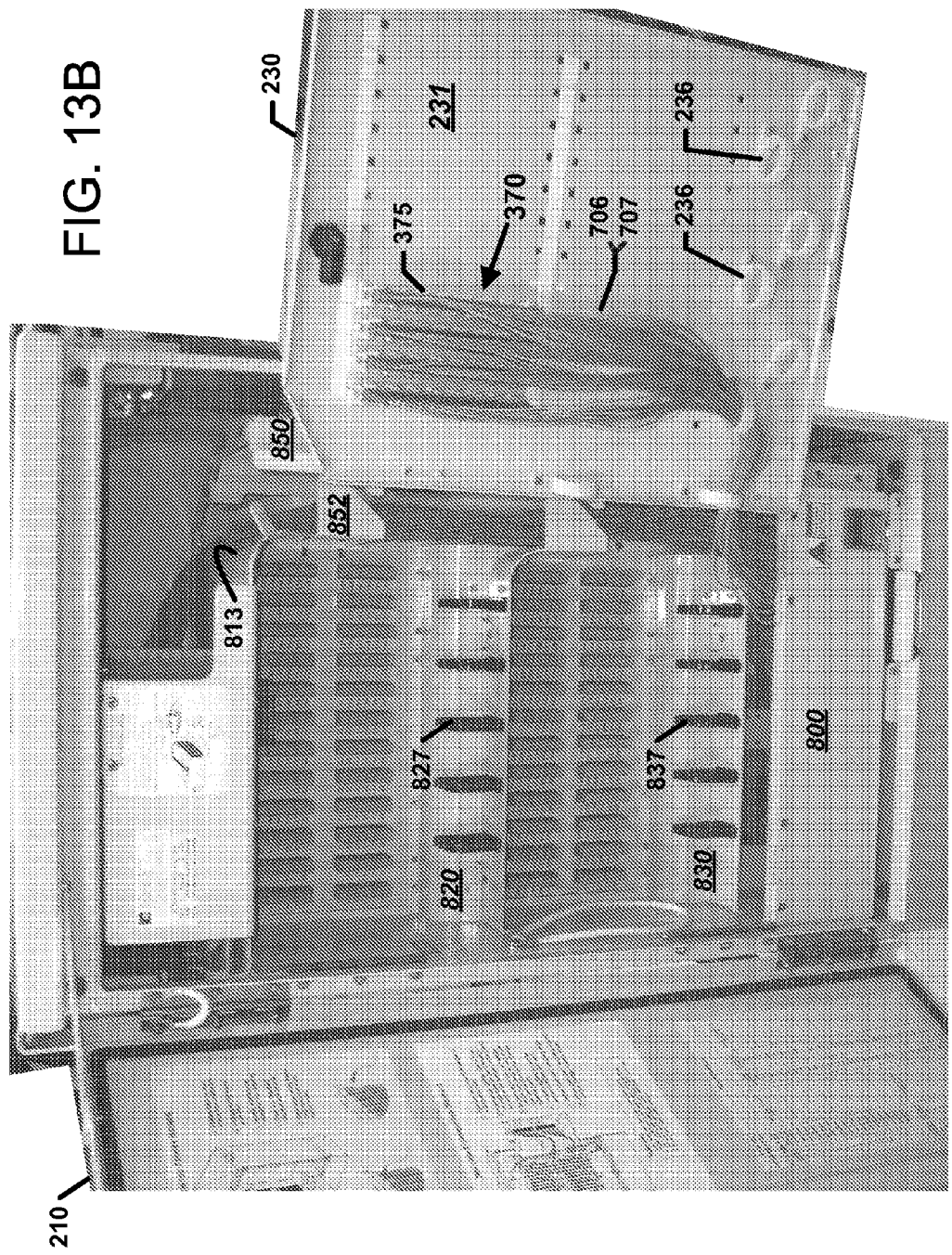

In accordance with some implementations, the first pass-through region 320 includes a frame 321 defining openings in which one or more pass-through adapters 325 can be mounted. Each pass-through adapter 325 is configured to align and optically couple together two fiber optic connectors to create an optical path. For example, each pass-through adapter 325 is configured to align and optically couple a first fiber optic connector terminating a pass-through input fiber 704 and a second fiber optic connector terminating a patch cord 707 (FIGS. 13A and 13B).

In the example shown, the frame 321 defines four vertically elongated openings, within each of which nine adapters 325 can be mounted. In other implementations, however, the frame 321 can define greater or fewer openings configured to hold greater or fewer adapters 325. The frame 321 also can be configured to hold the adapters 325 in different configurations (e.g., along horizontally extending rows, etc.). Adapter dust caps 326 can be positioned within the ports of the adapters 325.

In accordance with other implementations, the first pass-through region 320 can include one or more sliding adapter modules, each having a plurality of pass-through adapters 325. For example, one or more sliding adapter packs can be configured to slide upwardly and downwardly relative to the chassis 800. In one implementation, the first pass-through region 320 can include four sliding adapter packs, each including six pass-through adapters 325. In other implementations, however, the region 320 can include greater or fewer adapter packs, each carrying greater or fewer adapters 325. Additional information regarding the sliding adapter packs 332 can be found in U.S. Pat. Nos. 5,497,444; 5,717,810; 5,758,003; 6,591,051; and 7,194,181, the disclosures of which are hereby incorporated by reference.

In the example shown, the splitter module housing 312 and pass-through frame 321 are oriented so that the optical paths provided by the splitter modules 500 and pass-through adapters 325 extend generally orthogonal to the optical path created by the termination adapters 365 (FIG. 16) of the termination region 360 (e.g., side-to-side on the chassis 800 instead of front to rear). In other implementations, however, the splitter module housing 312 and pass-through frame 321 can be oriented in a different direction.

In certain implementations, the second location 350 (i.e., the location of the second pass-through region 330) also is on the chassis 800. For example, the second pass-through region 330 can be located at a bottom of the chassis 800 (see FIG. 14). In one implementation, the second pass-through region 330 is located below the termination region 360. In other implementations, however, the second pass-through region 330 can be located elsewhere within the cabinet 201.

Figure 12:
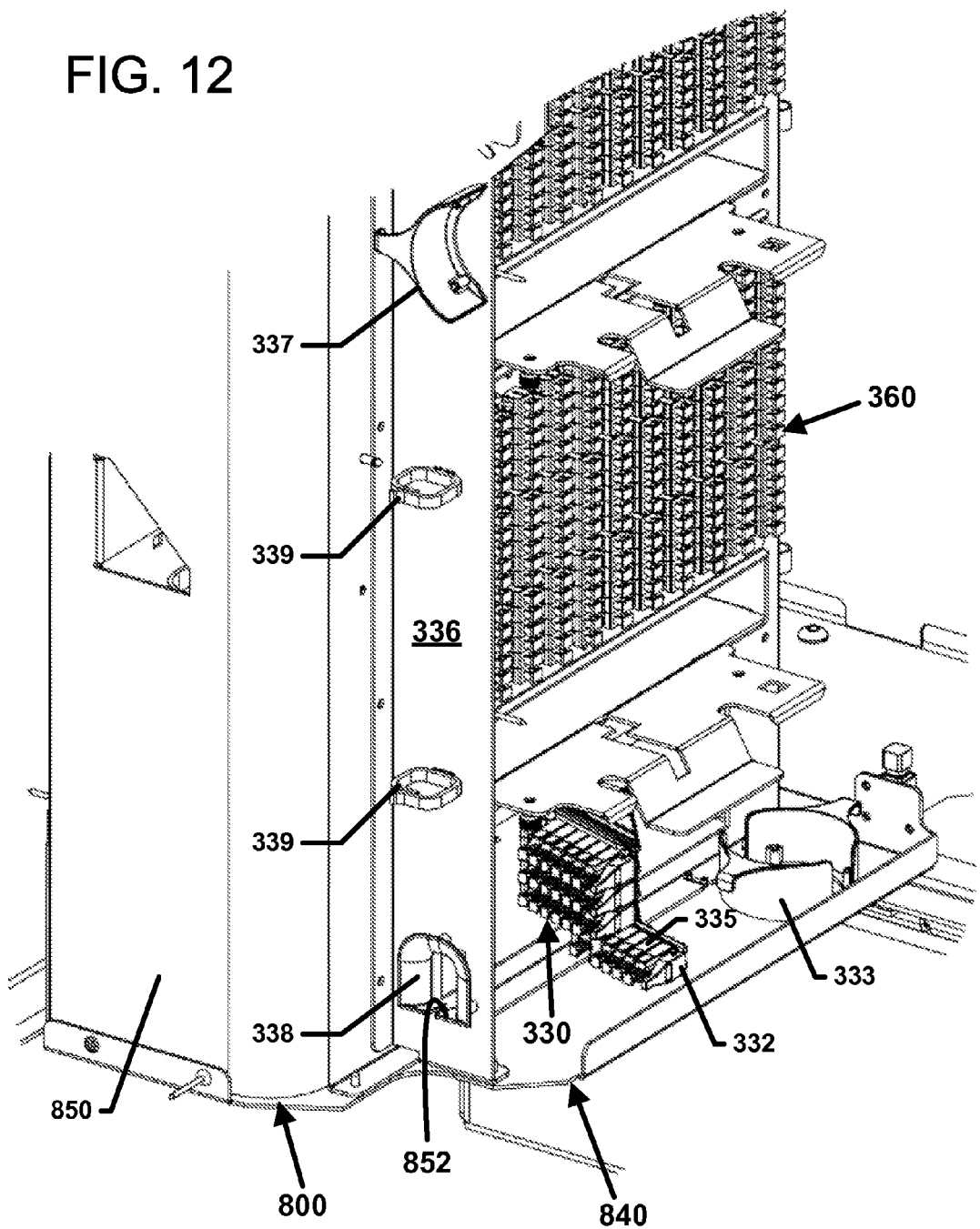
FIG. 12 is a partial view of the chassis of FIG. 10 showing a second location within the cabinet at which a second pass-through device is positioned in accordance with the principles of the present disclosure.

FIG. 12 shows one example implementation of the second pass-through region 330 mounted to the chassis 800. In the example shown, the second pass-through region 330 includes at least one sliding adapter pack 332 having a plurality of pass-through adapters 335. Each pass-through adapter 335 is configured to align and optically couple together two fiber optic connectors to create an optical path. For example, each pass-through adapter 335 is configured to align and optically couple a first fiber optic connector terminating a pass-through input fiber 705 and a second fiber optic connector terminating a patch cord 707.

To enable easier access to the individual fibers 705, 707, each adapter module 332 is configured to slide is a lateral direction from a first position to an extended position jutting outwardly from the remaining adapters 335. For example, the bottom adapter module 332 shown in FIG. 12 is slid out in the extended position. The sliding feature enables a user to access the fibers plugged into a particular adapter 335 without interfering with the remaining fibers. As noted above, additional information regarding sliding adapter packs can be found in U.S. Pat. Nos. 5,497,444; 5,717,810; 5,758,003; 6,591,051; and 7,194,181.

The second pass-through region 330 also includes a routing panel 336 along which the patch cords 707 are routed between the pass-through adapters 335 and the termination adapters 365. To accomplish such a routing, the chassis 800 includes an opening 852 defined in the routing panel 336, which faces the pass-through adapters 335. A radius limiter 338 (best seen in FIG. 12) extends outward from an external surface of the routing panel 336 at the opening 852 to inhibit excessive bending of the pass-through patch cords 707 routed through the opening 852. Additional details about the routing of the patch cords 707 will be provided herein.

Figure 9:
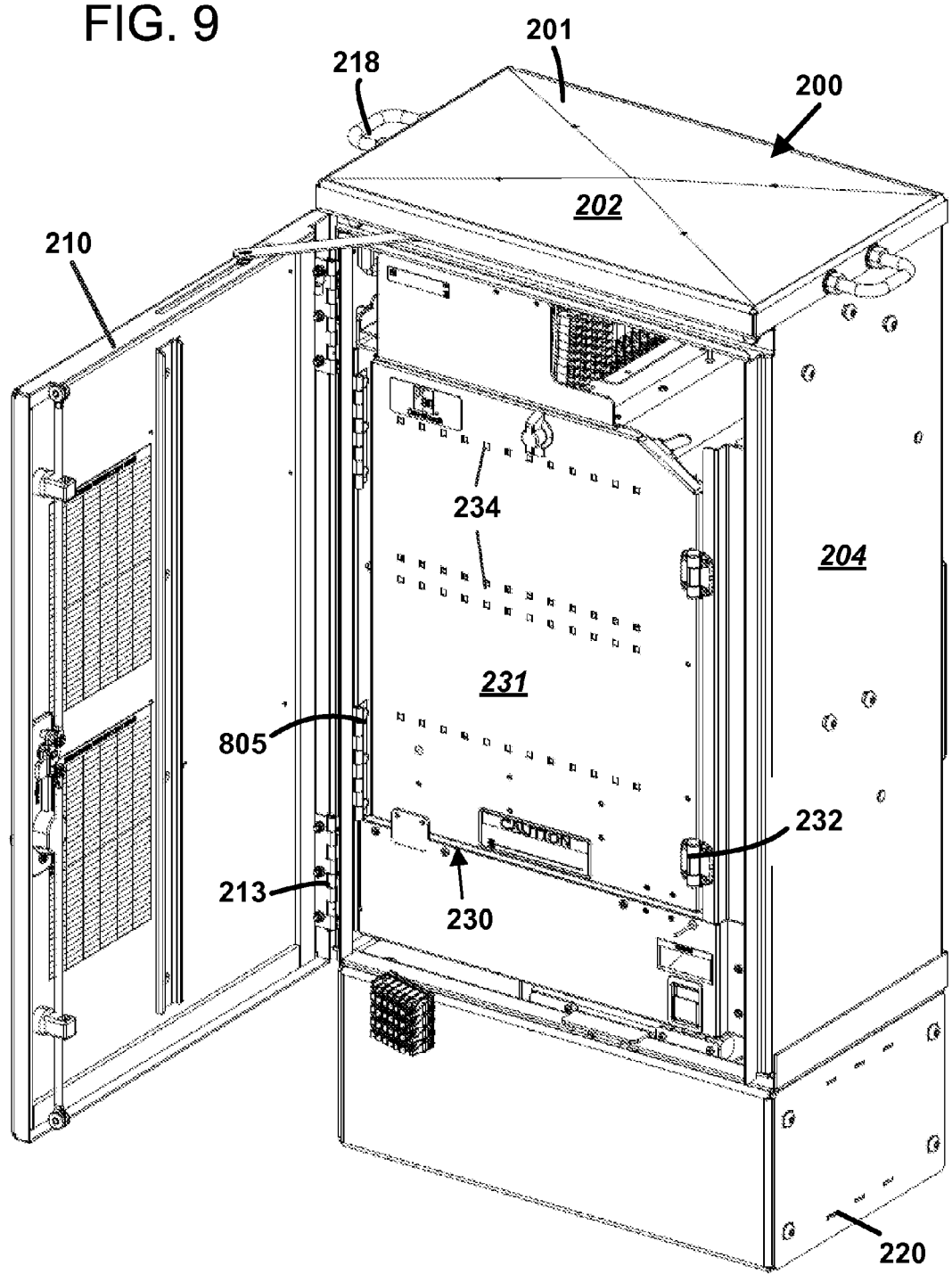
FIG. 9 is a front, perspective view of a fiber distribution hub including a cabinet with a door arranged in an open position so that an example frame is visible in accordance with the principles of the present disclosure.

In some implementations, the storage region 370 is located at a fixed location on the chassis 800. In other implementations, the storage region 370 is located on a frame 230 mounted within the cabinet 201. In certain implementations, the frame 230 is moveably mounted to the chassis 800. For example, in some implementations, the frame 230 is mounted to enable movement of the frame 230 between open and closed positions relative to the cabinet 201 and chassis 800. As shown in FIG. 9, one example frame 230 can be mounted to pivot about a hinge axis that is located on an opposite side of the cabinet 201 from the hinge axis of the chassis 800. In another implementation, the frame 230 is mounted to pivot about a hinge axis that is located on the same side of the cabinet 201 as the hinge axis of the chassis 800.

In certain implementations, the frame 230 can extend across the chassis 800 when the frame 230 is in the closed position and the frame 230 can provide access to the chassis 800 when the frame 230 is in the open position (e.g., compare FIG. 9 with FIGS. 13A and 13B). For example, in some implementations, a first side of the frame 230 faces the chassis 800 when the frame 230 is in the closed position and faces generally away from the chassis 800 when the frame 230 is in the open position. In some implementations, the storage modules 370 are provided on the first side of the frame 230. In such implementations, the storage modules 370 are not accessible from the access opening of the cabinet 201 until the frame 230 is moved to the open position (see FIGS. 13A and 13B).

One example frame 230 includes a panel 231 defining openings 234 (FIG. 9) at which storage modules 370 can be mounted. For example, FIGS. 13A and 13B show four example storage modules 370 mounted to the panel 231 via the openings 234. In the example shown, latching structures on either end of the storage modules 370 are inserted into the openings 234. Rings 236 or other fiber management structures also can be provided on the panel 231 to facilitate routing the fibers being stored.

Figure 14:
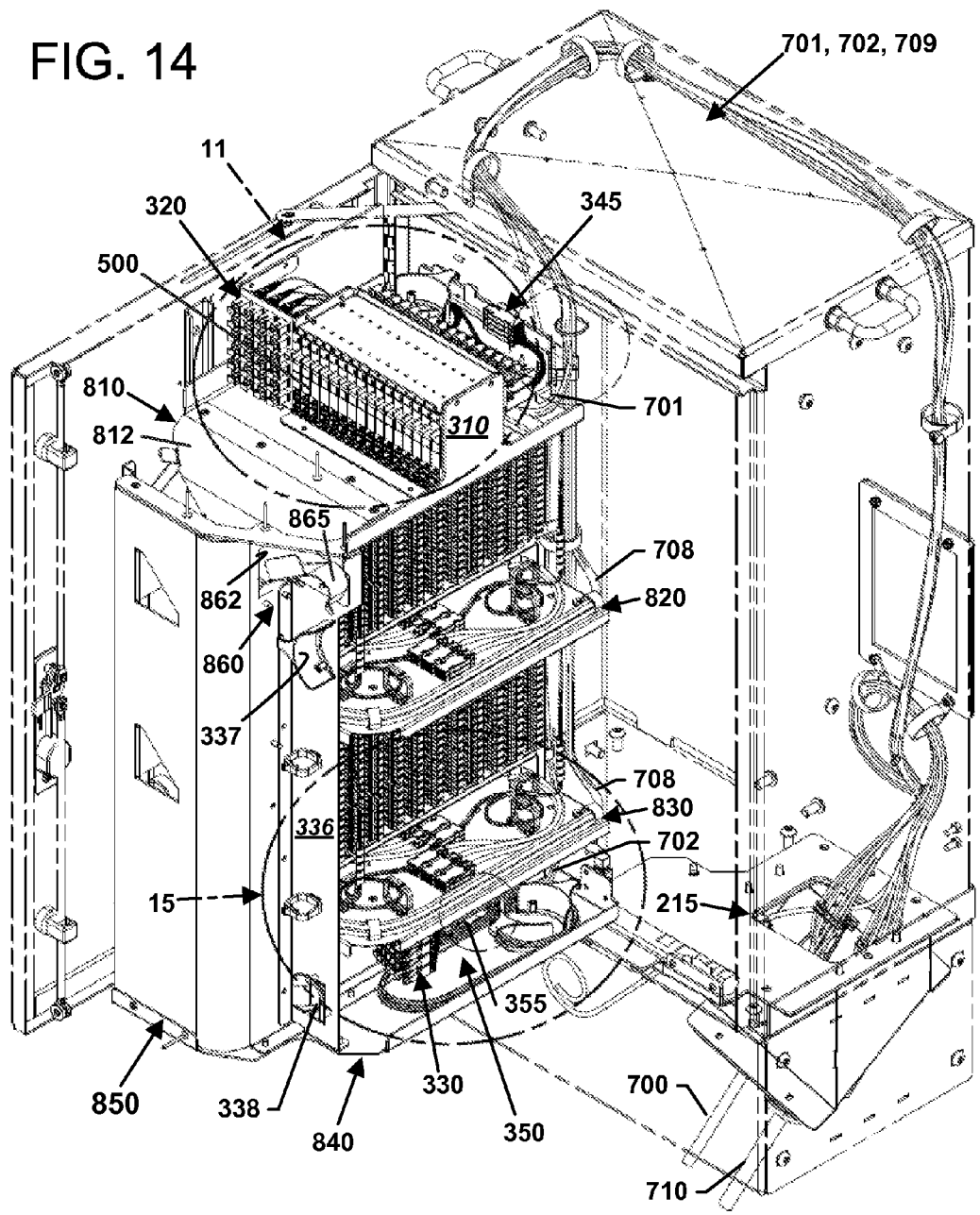
FIG. 14 is a top, front perspective view of the hub of FIG. 9 in which the chassis is in the open position and the walls of the cabinet are shown transparent to enable viewing of cables within the cabinet in accordance with the principles of the present disclosure.
Figure 15:
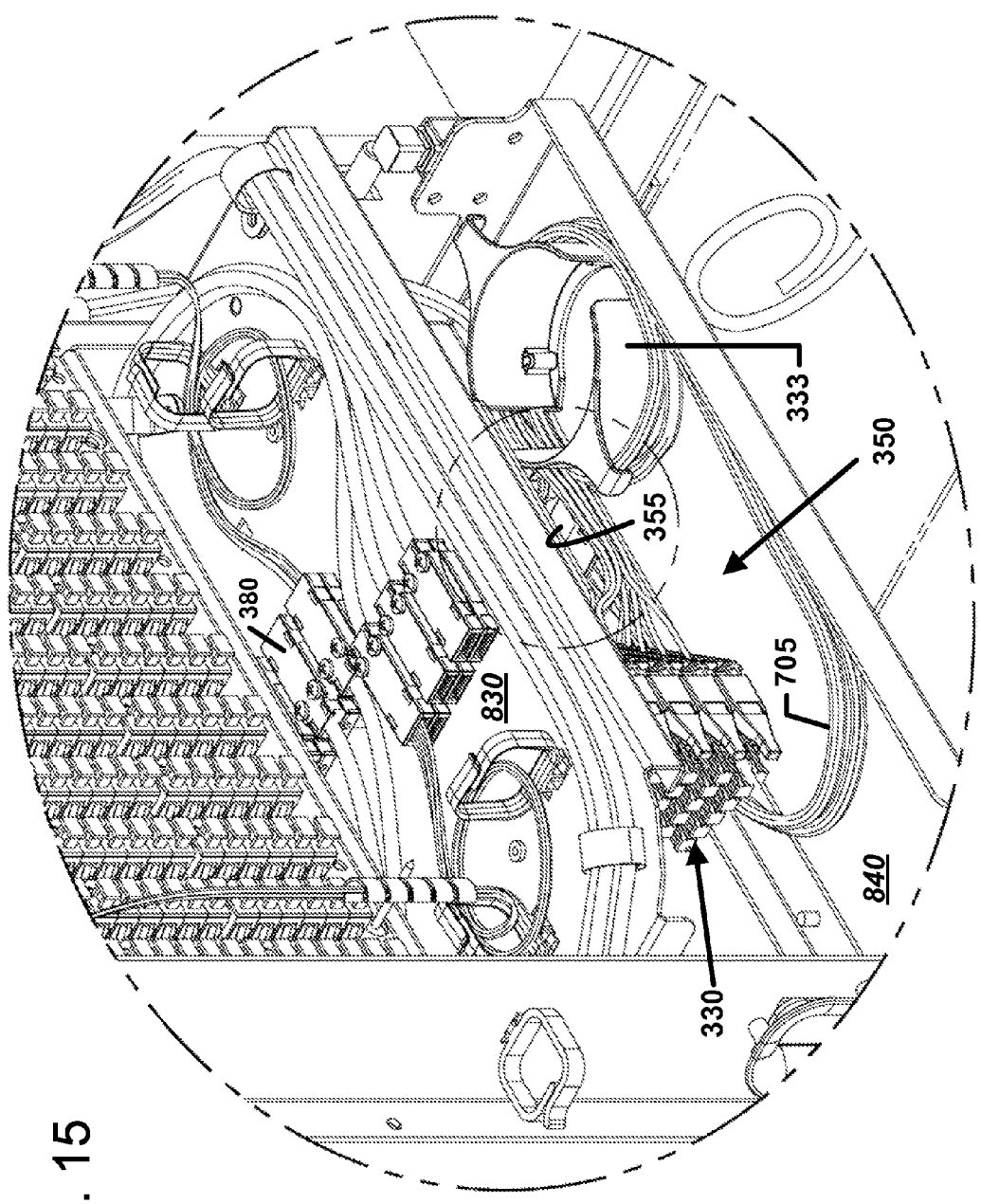
FIG. 15 is an enlarged view of a portion of FIG. 14, demarcated by the line 15 in FIG. 14, showing the second location within the hub of FIG. 9 at which a second pass-through device is positioned in accordance with the principles of the present disclosure.
Figure 16:
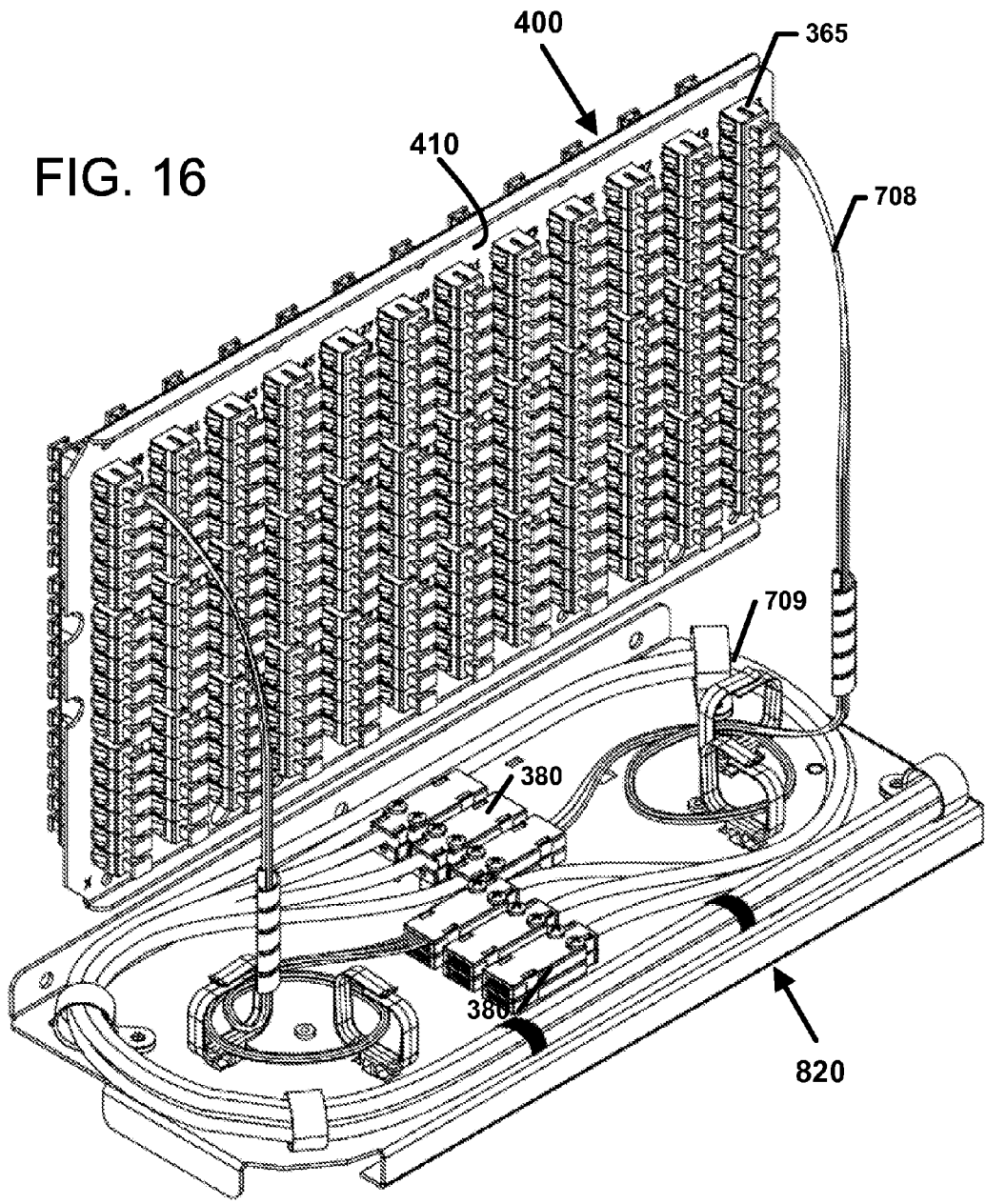
FIG. 16 is a perspective view of a terminal panel and chassis platform showing fiber routing in accordance with the principles of the present disclosure.

FIGS. 14-16 illustrate one example fiber routing configuration for the fiber distribution hub 200. As shown in FIG. 14, a feeder cable 700 and a subscriber cable 710 are routed into the cabinet 201 at a cable port 215. Buffered tubes 701, 702, 709 of fibers from the feeder and subscriber cables 700, 710 are routed through the cabinet to a top of the chassis 800. Groups of buffered tubes are separated out at different sections of the chassis 800 as the fibers are routed downwardly along a hinge axis side of the chassis 800.

As shown in FIG. 11, at least one buffered tube 701 is routed to the top platform 810 of the chassis 800 to a group of fanouts 345. At the fanouts 345, splitter input fibers 703 and first pass-through fibers 704 are separated out and routed to their respective regions 310, 320. One or more fiber management structures 347 (e.g., bend radius limiters, fiber spools, etc.) can be provided at the top platform 810 to retain excess fiber length (e.g., slack fiber length).

In some implementations, not every splitter module 500 mounted at the splitter module housing 312 receives a splitter input fiber 703. In certain implementations, at least one of the splitter modules 500 receives fewer splitter input fibers 703 than it is capable of receiving. In the example shown, the right-most splitter 500 does not receive any splitter input fibers 703. In accordance with some aspects, one or more pass-through input fibers 704 can be rerouted and plugged into the adapter assemblies 530 of the splitter modules 500 as splitter inputs if additional splitter inputs are desired.

Splitter pigtails 706 output by the splitter modules 500 are routed over a radius limiter 813 and down a side of the chassis 800. For example, the splitter pigtails 706 can be routed down a channel created by the routing structure 850 located on the side of the chassis 800 opposite the hinge axis. Flanges or other fiber retainers 852 are positioned along the channel created by the routing structure 850. In some implementations, the splitter pigtails 706 can be routed from the channel to one or more storage modules 370 (as shown in FIGS. 13A and 13B).

In other implementations, the splitter pigtails 706 can be routed from the channel to the termination region 360. For example, one or more splitter fibers 706 can be separated from the group within the channel and routed to platforms 820, 830 extending forwardly of the termination panels 410. Fiber management structures 827, 837 can be provided on each platform to facilitate organization and management of the splitter pigtails 706 (see FIGS. 13A and 13B).

Patch cords 707 having first ends plugged into the first pass-through adapters 325 can be routed along the same path as the splitter pigtails 706 (e.g., over radius limiter 813 and through the channel defined by the routing structure 850). Second ends of the patch cords 707 can be plugged into either the storage modules 375 or termination adapters 365 (see FIGS. 13A and 13B).

As shown in FIGS. 14 and 15, at least one buffered tube 702 is routed to the bottom platform 840 of the chassis 800 to a second group of fanouts 355. The second pass-through input fibers 705 are separated out at the fanouts 355 and wrapped around one or more fiber storage structures 333 (e.g., fiber spools, radius limiters, etc.). The second pass-through input fibers 705 can be stored on the bottom tray 840 until needed for service. In some implementations, the second pass-through input fibers 705 are plugged into the pass-through adapters 335. In other implementations, the second pass-through input fibers 705 are only plugged into the adapters 335 when service is required.

When service is required, the patch cords 707 are routed from ports on the pass-through adapters 335, through hole 852 in the routing panel 336, and up the side of the chassis 800 (see also FIG. 16). Fiber management structures 339 facilitate routing the fibers up the side of the routing panel 336 to a pass-through channel 860. The pass-through channel 860 is defined by a ramp 865 extending through an opening 862 in the routing structure 850. The patch cords 707 can be routed through the opening 862 from the rear side of the chassis 800 to the front side of the chassis 800. In one implementation, additional radius limiters 337 can be provided on the routing panel 336 to facilitate routing the patch cords 707 to the ramp 865. After passing through the opening 862, the patch cords 707 are routed down the channel at the front of the chassis 800 to the storage modules 375 or the termination modules 365.

At the termination field 360, connectorized ends of the splitter input fibers 706 and patch cord fibers 707 are plugged into adapters 365 to optically couple to connectorized ends of subscriber fibers 708. As shown in FIGS. 14-16, at least one buffer tube 709 is routed to one of the intermediate platforms 820, 830 of the chassis 800. Each platform 820, 830 includes one or more fanouts 380 at which subscriber fibers 708 are separated out from the buffer tubes 709. Connectorized ends of the subscriber fibers 708 are plugged into the second ports of the termination adapters 365 at the termination field 360.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A fiber distribution hub comprising:
a cabinet;
a chassis mounted to move relative to the cabinet;
a termination field mounted to the chassis;
a first location on the chassis at which a splitter region and a first pass-through region are positioned;
at least a first pass-through adapter disposed at the first pass-through region;
a second location on the chassis at which a second pass-through region is positioned, the second location being spaced from the first location; and
at least a second pass-through adapter disposed at the second pass-through region.

2. The fiber distribution hub of claim 1, wherein the first location is vertically spaced from the second location.

3. The fiber distribution hub of claim 1, wherein the first location is above the termination field and the second location is below the termination field.

4. The fiber distribution hub of claim 1, further comprising a frame mounted to move relative to the chassis, the frame including at least one storage module.

5. The fiber distribution hub of claim 1, wherein the termination field includes a plurality of adapters mounted to at least a first terminal panel.

6. The fiber distribution hub of claim 5, wherein the termination field includes two terminal panels, each retaining a plurality of termination adapters.

7. The fiber distribution hub of claim 1, wherein the first pass-through region includes a plurality of pass-through adapters mounted to a frame including the first pass-through adapter.

8. The fiber distribution hub of claim 1, wherein the second pass-through region includes a plurality of sliding adapter packs including the second pass-through adapter.

9. The fiber distribution hub of claim 1, wherein the first location is located at a top of the chassis.

10. The fiber distribution hub of claim 9, wherein the second location is located at a bottom of the chassis.

11. The fiber distribution hub of claim 1, further comprising:
- at least a first splitter module mounted at the splitter region;
- at least a first splitter input fiber received at the first splitter module; and
- a plurality of splitter pigtails extending out of the first splitter module.

12. The fiber distribution hub of claim 11, further comprising:
- at least a first pass-through input fiber received at the first pass-through adapter.

13. The fiber distribution hub of claim 12, wherein the first pass-through input fiber can be rerouted to be received at the first splitter module as a splitter input fiber.

14. The fiber distribution hub of claim 1, wherein the first pass-through region includes a plurality of sliding adapter packs, each including a plurality of adapters including the first pass-through adapter.

15. A fiber distribution hub comprising:
- a cabinet;
- a chassis mounted to move relative to the cabinet;
- a termination field mounted to the chassis;
- a first location on the chassis at which a splitter region and a first pass-through region are positioned, the first pass-through region including a plurality of pass-through adapters mounted to a frame; and
- a second location on the chassis at which a second pass-through region is positioned, the second location being spaced from the first location.

16. The fiber distribution hub of claim 15, wherein the first location is above the termination field and the second location is below the termination field.

17. A fiber distribution hub comprising:
- a cabinet;
- a chassis mounted to move relative to the cabinet;
- a termination field mounted to the chassis;
- a first location on the chassis at which a splitter region and a first pass-through region are positioned; and
- a second location on the chassis at which a second pass-through region is positioned, the second location being spaced from the first location, the second pass-through region including a plurality of sliding adapter packs.

18. The fiber distribution hub of claim 17, wherein the first location is above the termination field and the second location is below the termination field.

19. A fiber distribution hub comprising:
- a cabinet;
- a chassis mounted to move relative to the cabinet;
- a termination field mounted to the chassis;
- a first location on the chassis at which a splitter region and a first pass-through region are positioned, the first pass-through region including a plurality of sliding adapter packs, each sliding adapter pack including a plurality of adapters; and
- a second location on the chassis at which a second pass-through region is positioned, the second location being spaced from the first location.

20. The fiber distribution hub of claim 19, wherein the first location is above the termination field and the second location is below the termination field.

* * * * *